(12) United States Patent
Lang et al.

(10) Patent No.: US 9,874,241 B2
(45) Date of Patent: Jan. 23, 2018

(54) ROLLING BEARING

(71) Applicant: Schaeffler Technologies AG & Co. KG, Herzogenaurach (DE)

(72) Inventors: Johannes Lang, Oberreichenbach (DE); Stefan Hamper, Herzogenaurach (DE); Andre Anger, Uehlfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/300,011

(22) PCT Filed: Feb. 11, 2015

(86) PCT No.: PCT/DE2015/200076
§ 371 (c)(1),
(2) Date: Sep. 28, 2016

(87) PCT Pub. No.: WO2015/158337
PCT Pub. Date: Oct. 22, 2015

(65) Prior Publication Data
US 2017/0211618 A1  Jul. 27, 2017

(30) Foreign Application Priority Data

Apr. 15, 2014 (DE) .................. 10 2014 207 211

(51) Int. Cl.
| | | |
|---|---|---|
| *F16C 33/38* | (2006.01) | |
| *F16C 19/08* | (2006.01) | |
| *F16C 25/08* | (2006.01) | |
| *F16C 33/58* | (2006.01) | |

(52) U.S. Cl.
CPC .............. *F16C 19/08* (2013.01); *F16C 25/08* (2013.01); *F16C 33/3806* (2013.01); *F16C 33/3856* (2013.01); *F16C 33/588* (2013.01)

(58) Field of Classification Search
CPC ........... F16C 31/00; F16C 31/04; F16C 19/08
See application file for complete search history.

(56) References Cited

U.S. PATENT DOCUMENTS

| | | | |
|---|---|---|---|
| 2,164,497 A | | 7/1939 | Chamberlin |
| 3,578,829 A | * | 5/1971 | Hata ...................... B62M 3/003 384/458 |
| 3,801,171 A | * | 4/1974 | Rozentals ............. F16C 19/163 384/492 |
| 4,541,742 A | | 9/1985 | Lederman |
| 5,102,242 A | * | 4/1992 | Hussblein ............... F16C 19/06 384/516 |

(Continued)

FOREIGN PATENT DOCUMENTS

| | | |
|---|---|---|
| CH | 268081 | 8/1950 |
| CH | 264825 | 2/1959 |

(Continued)

*Primary Examiner* — Thomas R Hannon
(74) *Attorney, Agent, or Firm* — Volpe and Koenig, P.C.

(57) ABSTRACT

A rolling bearing including an outer ring, an inner ring and two annular, cage-guided rolling body rows, the two rolling body rows being axially pre-stressed by at least one spring element which is disposed therebetween, the two rolling body rows each being pre-stressed against a rim at the end of the outer ring, while the inner ring is axially movable against the restoring force of the spring element.

16 Claims, 2 Drawing Sheets

(56) References Cited

U.S. PATENT DOCUMENTS

| | | | | |
|---|---|---|---|---|
| 5,193,917 A | * | 3/1993 | Adler | F16C 25/083 |
| | | | | 384/517 |
| 6,158,896 A | * | 12/2000 | Zernickel | F16C 33/60 |
| | | | | 384/506 |
| 6,668,533 B2 | * | 12/2003 | Beckman | F16C 33/425 |
| | | | | 384/458 |

FOREIGN PATENT DOCUMENTS

| GB | 2147957 | 5/1985 |
|---|---|---|
| JP | H10103390 | 4/1998 |

\* cited by examiner

ROLLING BEARING

FIELD OF THE INVENTION

The invention relates to a rolling bearing comprising an outer ring, an inner ring, and two annular, cage-guided rolling body rows.

BACKGROUND

In some applications it is necessary to support a component so that it can rotate but simultaneously can also move in the axial direction.

One example here is the support of control elements in the interior of motor vehicles, e.g., in the form of control knobs such as push-pull actuators. There, plastic sliding bushings are typically used in order to hold the bearing axis of the control knob so that it can rotate and move axially. One such plastic sliding bearing exhibits increased wear over its service life, which leads to oscillations of the friction moment and thus to oscillations of the torque or the pressure force to be applied to the control element. Another disadvantage of the plastic sliding bushings is that they can be adjusted without play in the radial and axial directions only with difficulty.

SUMMARY

The invention is thus based on the objective of providing a bearing in which, in particular, the play-free setting in the radial and axial directions is improved.

The objective is achieved by a rolling bearing of the type name above that is distinguished according to the invention in that the two rolling body rows are pre-stressed in the axial direction by at least one spring element arranged between the two rows, wherein the two rolling body rows are each pre-stressed against a rim at the end of the outer ring, while the inner ring can be moved against the restoring force of the spring element.

Consequently, the invention relates to a rolling bearing that is set without play in the axial direction by a spring element. The rolling bodies held in cage-side pockets roll on the outer lateral surface of the inner ring and the inner lateral surface of the outer ring as well as in the area of the rims of the outer ring. The spring element is located between the rolling body rows and generates a force that prestresses the rolling body rows against the rims on the outer ring. Through this prestressing it is guaranteed that the rolling bodies contact the outer ring without play. In this way, undesired sliding and axial play is prevented. An actuation element that is held in the inner ring with its bearing axis is consequently supported so that it can rotate without play and securely in this way. Because the two rolling body rows contact, in addition to the two rims, also the lateral surfaces of the outer ring and the inner ring, the rolling bearing is also set without play in the radial direction in addition to being set without play in the axial direction. This two-row arrangement of the rolling body rows offers greater support against tilting compared with a single-row variant, which is also advantageous for the operation of the control element.

Another advantage is provided in that, in addition to freedom from play, a reduction or minimization of the friction can also be achieved by selecting the prestressing generated by the spring element accordingly. If the spring element is produced, e.g., from plastic, through corresponding material selection or variation of the material thickness or the geometry of the spring element, the prestressing can be optimized accordingly.

Relative to a sliding bushing, thus a radial and axial setting without play is made possible. The invention also offers the advantages of a rolling bearing, which are realized in the form of a low and constant moment of friction without large fluctuations throughout the service life.

Through the movement of the inner ring relative to the outer ring, in addition to the mentioned advantages, the spring element offers the ability to guide the actuation element also during an axial movement caused by pressing on the actuation element. To do this, a bearing axis or a bearing journal of the actuation element is held fixed in the inner ring. Because the inner ring can move against the restoring force of the spring element, a reversible axial movement can be realized, wherein the inner ring is also always guided over the rolling body rows. This produces a safe and play-free guidance of the actuation element, e.g., the control knob of a push-pull actuator, in each degree of freedom of movement.

A first embodiment of the invention provides that the spring element is constructed integrally with the cage of one of the two rolling body rows. Through this construction, the manufacturing process can be simplified, because the cage can be injection molded together with the spring element, for example, from plastic. In this way, a simple and economical production can be enabled, because the rolling bearing is also constructed from only a few parts.

This invention alternative can be advantageously refined by constructing the one-part cage from two ring sections, of which the first ring section comprises pockets holding the rolling bodies of the first rolling body row and the second ring section is turned toward the second rolling body row. Between the two ring sections there is at least one spring element. Through this refinement of the rolling bearing according to the invention, a uniform force transfer of the spring element to the rolling body rows is made possible, because the spring element transfers its force via the two ring sections to the rolling body rows with its rolling bodies distributed symmetrically in the circumferential direction.

Although there is the ability to provide a single annular, surrounding spring element, e.g., in the form of an accordion-like, angled spring section that extends between the ring sections, one refinement of this one-piece invention alternative provides that multiple spring elements are arranged between the ring sections, wherein these spring elements are realized in the form of V-shaped spring bars. Here, the two ends of the V-shaped spring bars are connected to the two ring sections of the cage. In addition, it can be preferred that additional bars are formed between the individual spring bars, wherein these additional bars limit the maximum spring deflection to the extent that they define the minimum distance that the two ring sections can approach each other due to exertion of an axial force on the inner ring.

For the simple coupling of the inner ring with the spring element or spring elements for enabling the axial resettable inner ring movement, the invention further provides that the second ring section contacts a radial rim of the inner ring on whose other side the second rolling body row contacts. Through this construction it can be achieved that the force of the spring element is uniformly transferred via the radial rim of the inner ring to the inner ring and thus to the rolling body row contacting the other side of the radial rim. In addition, the inner ring is supported in the axial direction so that a compressive force on the inner ring has the result that the spring element is compressed together via the radial rim.

Here, in a simple way a coupling of the inner ring with the spring element is made possible. If an axial force is exerted on the inner ring, the spring element is compressed via the radial rim. When the compressive force is taken away, the inner ring is brought back into the starting position by the restoring force of the spring element.

Alternatively, the rolling bearing can be constructed such that a separate spring element is arranged between the cages of the two rolling body rows. In this alternative, a separately produced spring element is formed as a standalone component between the rolling body rows. Therefore, dependent on the application, different prestressing forces that are adapted to the specific application can be generated in the rolling bearing according to the invention by exchanging spring elements of different spring stiffness values.

This alternative with a separate spring element can be refined according to the invention in that the cage of the first rolling body row has a ring section on which the similarly annular spring element is supported that contacts the radial rim of the inner ring on the opposite side, wherein the second rolling body row contacts its other side. In addition to a simple coupling of the spring element with the rolling body rows, the spring element can also transfer its force uniformly to the rolling body rows.

In this invention alternative, the spring element constructed as a separate part can also have two ring sections between which there are multiple V-shaped spring bars that are attached at their ends directly to the ring sections.

Alternatively, the use of other spring elements or shapes of spring bars would also be conceivable, e.g., a metallic helical spring, a spring element made from rubber, a bellows-like spring element, or a similar spring device that enables tensioning of the two rolling body rows against the rims on the outer ring of the rolling bearing.

The cage and/or the spring element are preferably made from plastic. Through the production of the cage from plastic, a contact of steel on steel between the cage and the rolling bodies is prevented. This offers the advantage that the bearing generates low noise. In addition, there is the advantage that especially in the embodiment in which the cage has the integrated spring element, the entire element can be produced in one piece by plastic injection molding, for example. This reduces the complexity and costs in the production process. The rolling bodies can likewise be made from steel or plastic, wherein a non-identical material pairing should be considered especially for enabling low-noise running. A production of the cage or the spring element from metal is also possible, as long as elasticity is guaranteed with respect to the spring element.

The outer ring and inner ring are finally preferably produced through deep-drawing of a steel sheet. This offers the advantage that the outer ring and inner ring can be produced easily and economically. Here, the outer ring and the inner ring can be made from hard steel or also from soft steel due to the low load. The construction of the outer ring and inner ring from plastic is also conceivable.

The rolling bearing according to the invention can also be refined to the extent that at least one disk for sealing the rolling bearing is arranged axially between the rolling body rows and the rims of the outer ring. Through the use of such a disk, a sealing effect can be realized. Therefore, it can be prevented on one hand that dirt and foreign particles can penetrate into the rolling bearing through the open positions between the rims of the outer ring and the outer lateral surface of the inner ring and thus the running properties of the rolling bearing are negatively affected. On the other hand, the attachment of such a disk for sealing is useful to the extent that lubricant loss can be prevented. Both mechanisms contribute to increasing the service life of the rolling bearing.

BRIEF DESCRIPTION OF THE DRAWINGS

An embodiment of the invention is shown in the drawing and is described in more detail below. Shown are.

DETAILED DESCRIPTION OF THE PREFERRED EMBODIMENTS

Figure 1:
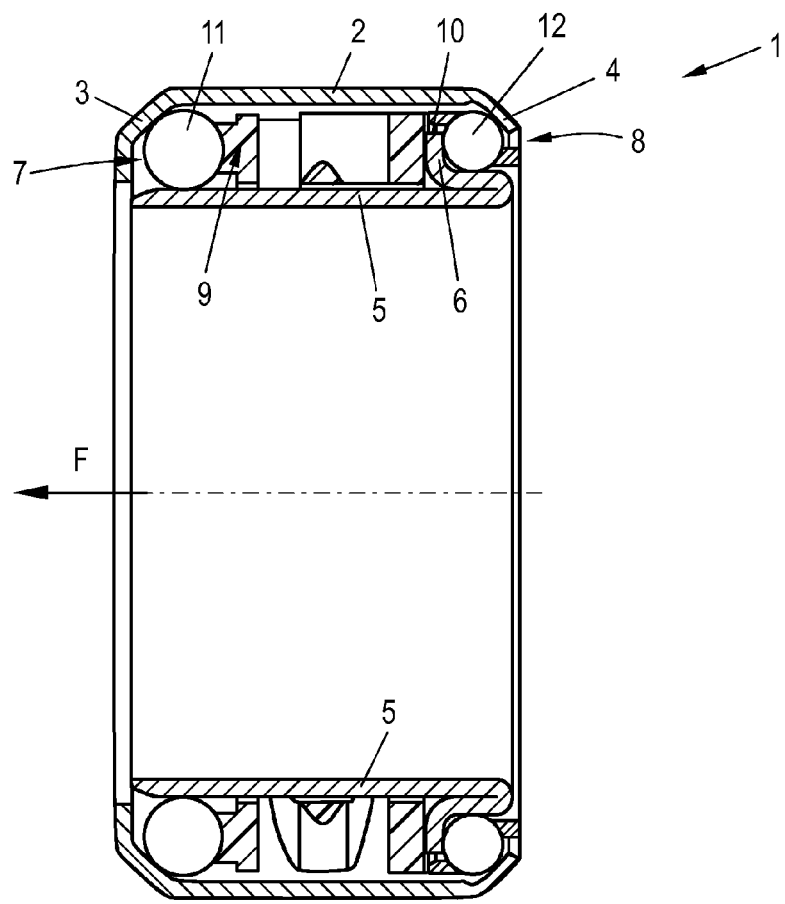
FIG. 1 a section view through an embodiment of the rolling bearing.

FIG. 1 shows a cross section of the rolling bearing 1 according to the invention. An outer ring 2 is shown that has radial chamfered rims 3 and 4 on its edges. An inner ring 5 is arranged coaxially within the outer ring 2. The inner ring 5 has a radial rim 6 that is constructed radially in the direction of the outer ring 2 on the inner ring 5 through corresponding molding. The inner ring 5 and the outer ring 2 are deep-drawn from sheet steel in this embodiment.

Between the outer ring 2 and the inner ring 5 there are two cage-guided rolling body rows 7 and 8 comprising multiple rolling bodies in the form of balls. In the axial direction, the first rolling body row 7 contacts the rim 3 of the outer ring 2. The second rolling body row 8 contacts, viewed axially, between the radial rim 6 of the inner ring 5 and the other rim 4 of the outer ring 2. Viewed radially, the two rolling body rows 7 and 8 are in contact with the inner lateral surface of the outer ring 2 and the outer lateral surface of the inner ring 5 and roll on these surfaces. The two rolling body rows 7 and 8 are guided in cages 9 and 10. The cages 9 and 10 have pockets that hold the rolling bodies 11 and 12 of the two rolling body rows 7 and 8. The cage 9 is made from two ring sections 13 and 14, wherein the first ring section 13 comprises the pockets holding the rolling bodies 11 of the first rolling body row 7 and the second ring section 14 contacts the radial rim 6.

Figure 2:
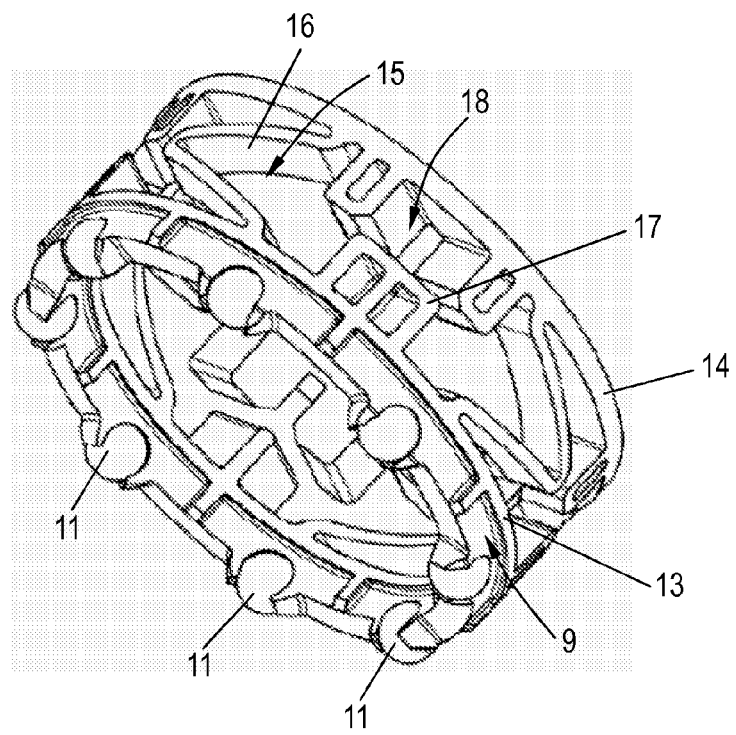
FIG. 2 a perspective view of the cage of the rolling bearing from FIG. 1, FIG. 3 a section view analogous to FIG. 1 with deflected inner ring, and FIG. 4 an embodiment of the cage of the rolling bearing with separate spring element.

In the axial direction, multiple spring elements 15 are arranged between the ring section 14 and the ring section 13 in the intermediate space between the outer ring 2 and inner ring 5. The spring elements 15 are shown in FIG. 2 in a perspective view. It can be seen that the spring elements 15 run in the circumferential direction, wherein an orientation in the radial direction is to be preferred, because the spring elements 15 would otherwise require additional installation space for compression by a force F and freedom from play in the radial direction would be made more difficult. The spring elements 15 are formed in the shape of V-shaped spring bars 16. At the ends of the spring bars 16, these are connected integrally to the two ring sections 13 and 14 and thus integrally to the cage 9.

Between the individual spring bars 16 there are bars 17 on the ring section 13 and facing the ring section 14. The ring section 14 has recesses 18 that are complementary to the bars 17 and face these bars and in which the bars 17 engage when the spring element is compressed. By the use of these bars 17, for the use of the rolling bearing in an actuation element formed as a push-pull button, the maximum axial movement travel of the actuation element when pressed can be set.

Through the restoring force of the spring elements 15, the rolling body row 7 is pre-stressed without play by the ring section 13 and the rolling body row 8 is pre-stressed without play by the ring section 14 and the radial rim 6. The two rolling body rows 7 and 8 here contact, on one hand, at the rims 3 and 4 of the outer ring 2. In addition, the two rolling body rows 7 and 8 are pre-stressed in the radial direction between the outer lateral surface of the inner ring 5 and the inner lateral surface of the outer ring 2. Thus, in the rolling bearing 1 according to the invention, play-free prestressing both in the radial and also axial directions is guaranteed.

Figure 3:
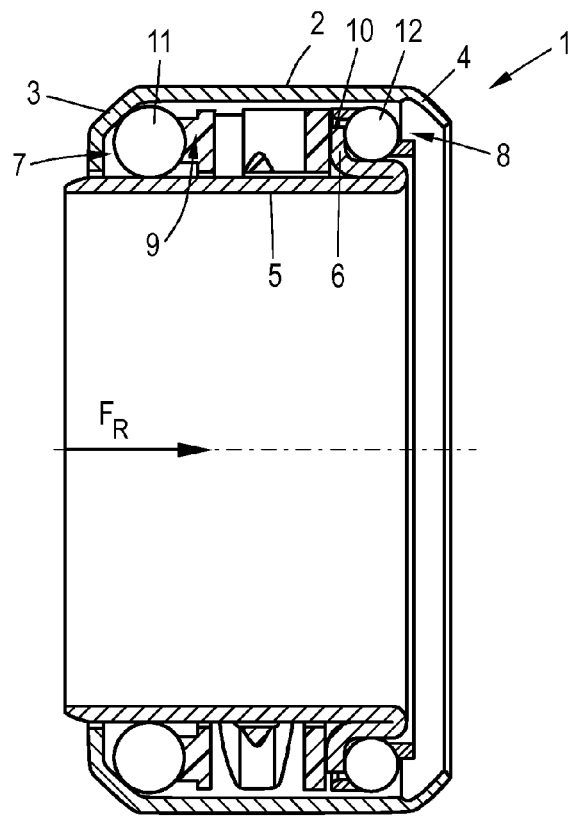

In FIG. 1 and FIG. 3 it is also shown that by exerting a force F in the direction of the arrow on the inner ring 5, this is moved relative to the outer ring 2 axially out of a starting position (FIG. 1) against the restoring force FR generated by the spring element 15 into an axially displaced position (FIG. 3). The inner ring 5 is here guided in each position by the two rolling body rows 7 and 8. Here, the force F that is given, for example, by an actuation element held fixed in the inner ring with a bearing journal is transferred to the inner ring 5, to the ring section 14 via the radial rim 6, and thus onto the spring element 15. The inner ring 5 or the bearing journal can press onto an element located behind the rolling bearing 1 by this movement relative to the rest of the rolling bearing 1 that is fixed axially in a bearing holder by means of the outer ring 2. Through the compression of the spring element 15, the restoring force FR of the spring element 15 is established. In FIG. 3, the inner ring 5 deflected out of its starting position and the compressed spring element 15 can be seen.

If the actuation element is relaxed again, the inner ring 5 is moved back in the direction of its starting position by the restoring force FR of the spring element 15, which is shown in FIG. 1.

Figure 4:
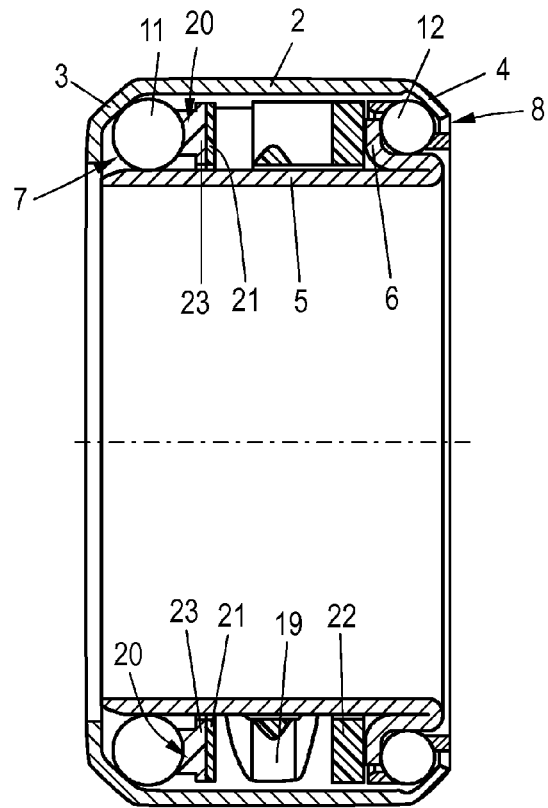

In contrast to the integral construction according to FIGS. 1 to 3, FIG. 4 shows the embodiment of the rolling bearing 1 with separate spring element 19. FIG. 4 differs from FIG. 1 in that—for an otherwise identical construction—the spring element in FIG. 4 is not connected integrally to the cage as in FIG. 1. Instead, the spring element 19 is located as a separate part between the cage 20 of the first rolling body row 7 and the radial rim 6. In this embodiment, the two ring sections 21 and 22 are part of the spring element 19. Here, the ring section 21 contacts the ring section 23 of the cage 20 of the first rolling body row 7 and the ring section 22 contacts the radial rim 6. In this embodiment, the spring element 19 also comprises V-shaped spring bars 16 that generate the prestressing for tensioning the rolling body rows between the radial bars of the outer ring and also the restoring force for the axial displacement of the inner ring.

Thus, through the rolling bearing 1 according to the invention it is guaranteed, on one hand, that the two rolling body rows 7, 8 are pre-stressed without play in the axial and radial directions by spring-elastic elements 15, 19, whereby the contacts between the rolling bodies 11, 12 and the inner ring 5 and outer ring 2 are under slight prestressing, but still generate no significant friction. On the other hand, the spring elements 15, 19 make possible a reversible axial movement of the inner ring 5.

LIST OF REFERENCE NUMBERS

1 Rolling bearing
2 Outer ring
3 Rim
4 Rim
5 Inner ring
6 Radial rim
7 Rolling body row
8 Rolling body row
9 Cage
10 Cage
11 Rolling body
12 Rolling body
13 Ring section
14 Ring section
15 Spring element
16 Spring bar
17 Bar
18 Recess
19 Spring element
20 Cage
21 Ring section
22 Ring section
23 Ring section

The invention claimed is:

1. A rolling bearing comprising an outer ring, an inner ring, and rolling bodies arranged in two annular, cage-guided rolling body rows, the two rolling body rows are axially pre-stressed by at least one spring element arranged between the two rows, wherein the two rolling body rows are each pre-stressed against a rim at an end of the outer ring, and the inner ring is movable axially against a restoring force of the at least one spring element, the at least one spring element is constructed integrally with a cage of one of the two rolling body rows.

2. The rolling bearing according to claim 1, wherein the cage is made from a first ring section with pockets that hold the rolling bodies of the first rolling body row, a second ring section that is turned toward the second rolling body row, and the at least one spring element between the two ring sections.

3. The rolling bearing according to claim 2, wherein the at least one spring element comprises multiple spring elements provided between the ring sections, wherein the spring elements are constructed as V-shaped spring bars.

4. The rolling bearing according to claim 2, wherein the second ring section contacts a radial rim of the inner ring on whose other side the second rolling body row contacts.

5. The rolling bearing according to claim 1, wherein at least one of the cage or the at least one spring element are made from plastic.

6. The rolling bearing according to claim 1, wherein at least one disk for sealing the rolling bearing is arranged axially between the rolling body rows and the rims.

7. A rolling bearing comprising an outer ring, an inner ring, and rolling bodies arranged in two annular, cage-guided rolling body rows, the two rolling body rows are axially pre-stressed by at least one spring element arranged between the two rows, wherein the two rolling body rows are each pre-stressed against a rim at an end of the outer ring, and the inner ring is movable axially against a restoring force of the at least one spring element, wherein the at least one spring element is arranged as a separate component between the two rolling body rows, wherein a cage of the first rolling body row has a ring section on which the at least one spring element is supported and contacts an opposite side on a radial rim of the inner ring on whose other side the second rolling body row contacts.

8. The rolling bearing according to claim 7, wherein the at least one spring element has two ring sections between which there are multiple V-shaped spring bars.

9. The rolling bearing according to claim 7, wherein the at least one spring element is made from plastic.

10. The rolling bearing according to claim 7, wherein at least one disk for sealing the rolling bearing is arranged axially between the rolling body rows and the rims.

11. A rolling bearing comprising an outer ring, an inner ring, and rolling bodies arranged in two annular, cage-guided rolling body rows, the two rolling body rows are axially pre-stressed by at least one spring element arranged between the two rows, wherein the two rolling body rows are each pre-stressed against a rim at an end of the outer ring, and the inner ring is movable axially against a restoring force of the at least one spring element, wherein the at least one spring element is made from plastic.

12. The rolling bearing according to claim 11, wherein the at least one spring element is constructed integrally with a cage of one of the two rolling body rows.

13. The rolling bearing according to claim 12, wherein the cage is made from a first ring section with pockets that hold the rolling bodies of the first rolling body row, a second ring section that is turned toward the second rolling body row, and the at least one spring element between the two ring sections.

14. The rolling bearing according to claim 13, wherein the at least one spring element comprises multiple spring elements provided between the ring sections, wherein the spring elements are constructed as V-shaped spring bars.

15. The rolling bearing according to claim 13, wherein the second ring section contacts a radial rim of the inner ring on whose other side the second rolling body row contacts.

16. The rolling bearing according to claim 11, wherein at least one disk for sealing the rolling bearing is arranged axially between the rolling body rows and the rims.

* * * * *